Figure 1:
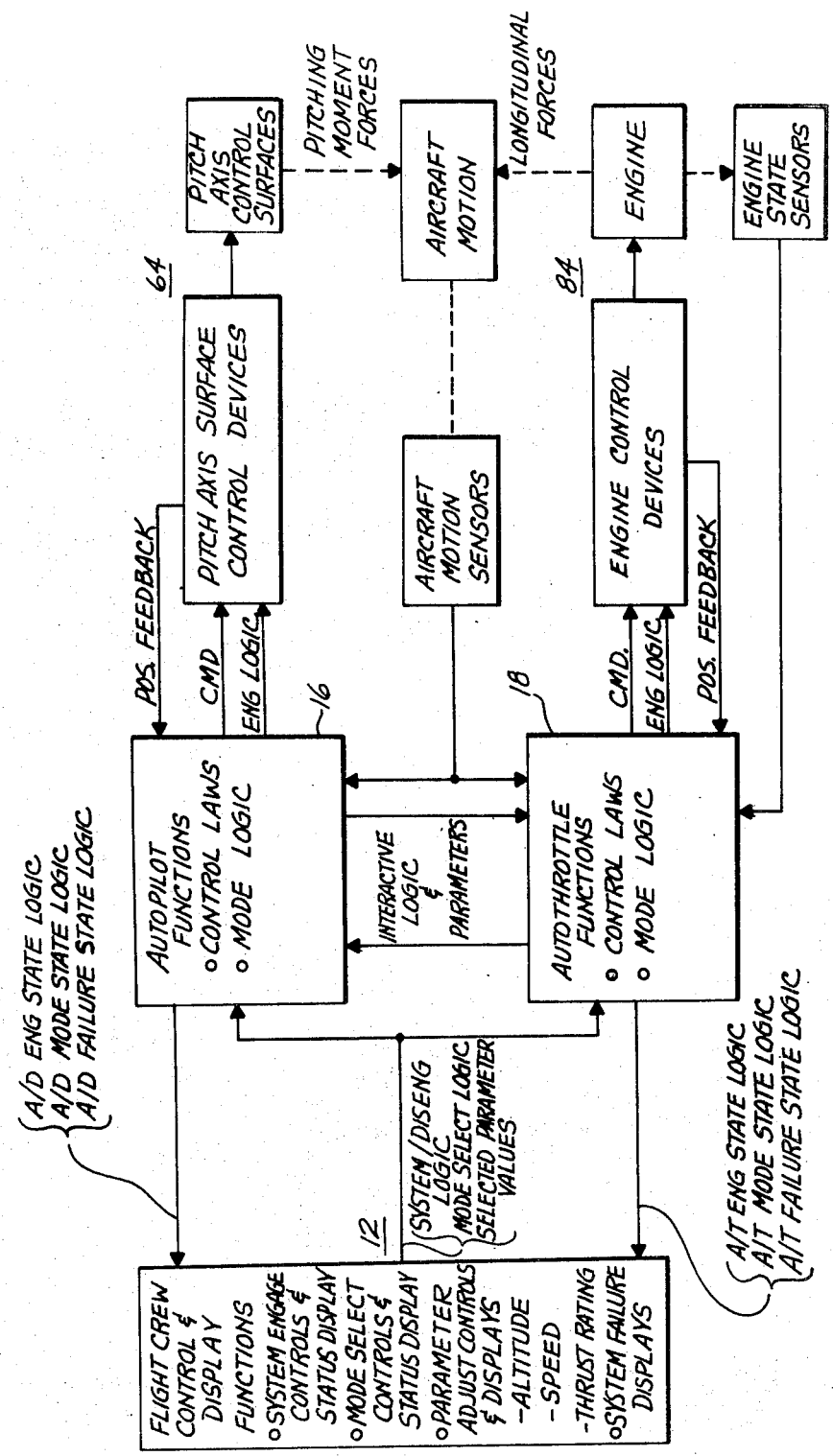

United States Patent [19]

Robbins et al.

[11] Patent Number: 4,471,439
[45] Date of Patent: Sep. 11, 1984

[54] METHOD AND APPARATUS FOR AIRCRAFT PITCH AND THRUST AXES CONTROL

[75] Inventors: Richard E. Robbins, Kirkland; Robert D. Simpson, Bellevue, both of Wash.

[73] Assignee: The Boeing Company, Seattle, Wash.

[21] Appl. No.: 546,255

[22] Filed: Oct. 28, 1983

Related U.S. Application Data

[62] Division of Ser. No. 419,673, Sep. 20, 1982.

[51] Int. Cl.³ .............................................. G05D 1/08
[52] U.S. Cl. .................................. 364/433; 244/181; 244/182; 340/978
[58] Field of Search ............................. 364/431–434, 364/565, 705, 709, 710; 73/488, 178 R, 178 T, 179; 244/180–182, 188; 318/584; 340/969, 970, 971, 977, 978, 945

[56] References Cited

U.S. PATENT DOCUMENTS

| | | |
|---|---|---|
| 3,105,660 | 10/1963 | Lenefsky et al. ..................... 244/188 |
| 3,586,268 | 6/1971 | Melvin ................................ 244/181 |
| 3,691,356 | 9/1972 | Miller ................................. 244/182 |
| 3,925,777 | 12/1975 | Clark .................................. 340/756 |
| 3,945,590 | 3/1976 | Kennedy, Jr. et al. ............. 244/181 |
| 3,945,593 | 3/1976 | Schanzer ............................ 244/181 |
| 4,129,275 | 12/1978 | Gerstine et al. .................... 244/181 |
| 4,159,088 | 6/1979 | Cosley ............................... 364/433 |
| 4,237,540 | 12/1980 | Sato ................................... 364/705 |
| 4,277,041 | 7/1981 | Marrs et al. ........................ 244/182 |
| 4,312,041 | 1/1982 | DeJonge ............................ 340/969 |

Primary Examiner—Gary Chin
Attorney, Agent, or Firm—Conrad O. Gardner; B. A. Donahue

[57] ABSTRACT

An aircraft automatic of semiautomatic vertical path control system which coordinates operation of pitch and engine thrust control systems to transfer speed control from one system to the other depending on a requirement to climb, descend, or maintain altitude as determined by the polarity and magnitude of the difference between a selectable desired altitude and current actual altitude.

1 Claim, 3 Drawing Figures

METHOD AND APPARATUS FOR AIRCRAFT PITCH AND THRUST AXES CONTROL

This is a division of application Ser. No. 419,673, filed Sept. 20, 1982.

This invention relates to vertical flight path control of an aircraft and more particularly to method and apparatus for achieving through automatic or semiautomatic control, single mode selection for both autopilot and autothrottle.

Improved speed control of an aircraft which is being automatically controlled simultaneously in the pitch axis by elevator control and in the longitudinal axis by throttle control is exemplified by U.S. Pat. No. 2,888,219 to Beers, et al. issued May 26, 1959. Beers, el al. is illustrative of the use of a pitch command rate input signal into the throttle control law to automatically compensate for speed changes due to aircraft pitch attitude changes. In contrast, a preferred embodiment of the present invention relates to a means for selecting the appropriate modes of operation for the elevator and throttle systems to provide automatic climb, descent, and altitude capture and hold through a common set of select controls without special emphasis on the specific control laws or signal sources required to implement such control laws used in the various modes of operation.

An early U.S. Pat. No. 2,961,200 to Seliger, el al. issued Nov. 22, 1960 relates to an automatic altitude hold and speed hold system for propeller driven aircraft. Seliger, et al. discloses the physical implementation (sources required) for acquiring and processing the required signals. In contrast, a preferred embodiment of the present invention is not concerned primarily with the signal acquisition and processing of control laws but with logic control of operational modes of aircraft elevator and thrust systems.

U.S. Pat. No. 2,933,268 issued Apr. 19, 1960 to Jude, el al. shows a system for providing stall prevention for an aircraft which is being automatically controlled in the pitch (elevator) and longitudinal (thrust) axis. In contrast, Jude, et al. is further directed to automatic compensation for aircraft configuration changes (gross weight, flap position, etc.) and the effects of wind gusts.

A further exemplary reference in the field of altitude and thrust control systems includes U.S. Pat. No. 3,945,593 to Schanzer issued Mar. 23, 1976. Schanzer shows automatic control of elevator and throttles of an aircraft in a manner for reducing coupling between pitch and longitudinal axis with emphasis on control laws and aircraft state variables to implement the control laws.

Turning now more specifically to aircraft vertical path control as presently practiced, it should be noted that during the climb and descent phases of a flight, an aircraft is commonly controlled in speed through the elevator system and in rate of climb and descent through engine thrust. However, during the cruise phase or whenever a particular altitude must be maintained, the altitude of the aircraft is controlled through the elevator and the speed is controlled through engine thrust.

Desired speeds and rates of climb or descent are variables which are dependent on many factors. For example, the climb speed may be established initially as an indicated airspeed (knots) for the first portion of the climb and subsequently established as a desired mach number; with both values being determined to provide, e.g. minimum fuel to altitude, or minimum time to altitude. Similarly, the engine thrust setting is commonly established for maximum fuel conservation, or, for other considerations. Also, during cruise, the altitude and speed (or Mach number) are variable and chosen to provide, for example, maximum range.

When a pilot is manually flying the aircraft, he is required to control the aircraft elevator and engine thrust, through the manual controls, to establish and maintain the desired values of speed, altitude, rate of climb, etc., as indicated to him by the various aircraft instruments. Prior automatic and semiautomatic flight control systems have so far provided automatic, or semiautomatic modes of control in one or both of the control axes.

Such devices as engine thrust (EPR or $N_1$) control and airspeed and Mach Hold control modes for the elevator have been utilized, and in the utilization of these devices, the pilot selects the appropriate mode of operation for the pitch (elevator control) axis and for the engine control.

According to present flight control practices it is possible to have both control systems engaged or only one control system engaged and operate the other manually. However, apart from interlock devices which prevent both systems from trying to control the aircraft speed at the same time, the two control systems are independent.

Therefore, in the aforementioned systems, the pilot must manually effect the change over from one device controlling speed to the other. For example, the pilot may engage the thrust control system to maintain a desired engine speed ($N_1$) or Engine Pressure Ratio (EPR) and engage the pitch (elevator) control system to maintain the desired indicated airspeed (IAS) or Mach number for climb. If now, a given altitude must be maintained, the pilot must engage the pitch axis in an altitude control mode and change the thrust control to maintain aircraft speed or Mach number. If then, subsequently, the pilot wishes to resume climbing he must change the operating modes of both the pitch and thrust control system to establish the desired flight path. Furthermore, these actions often necessitate the manipulation of speed select control devices and/or the precise operation, in time, of speed control modes if the control mode is of the hold type rather than the select type.

Accordingly, it is an object of this invention to provide a single speed (IAS or Mach) control device which provides the desired reference value whether the pitch axis control system or the engine thrust control system is controlling the aircraft speed.

It is another object of the invention to provide a means of selecting and displaying a desired altitude and an automatic control to capture and maintain that altitude through the pitch control system.

It is a further object of the invention to provide means for automatically capturing and maintaining the present altitude.

It is yet another object of the present invention to provide a method for coordinated operation of pitch and engine thrust control systems of an aircraft to automatically transfer speed control from one system to the other depending upon current requirements; i.e., climbing, descending, or maintaining altitude.

It is a still further object of the invention to provide system coupling through a further device containing preprogrammed or pilot programmable vertical path profiles to generate the values, either fixed or variable, for aircraft speed, engine thrust, and altitude.

It is still another object of the invention to provide means for coupling and uncoupling the computed control outputs to either the automatic elevator and engine control systems or to couple the pitch control outputs to a Flight Director for semiautomatic operation.

It is a still further object of the invention to provide the current maneuver requirements, i.e. to climb, to descend, or to maintain altitude by means of a device which determines the polarity and magnitude of the difference between a selectable desired altitude and current actual altitude.

These and other objects are achieved in accordance with a preferred system embodiment of this invention which includes a single speed control device and readout which provides the desired reference value whether the pitch axis control system or the engine thrust control system is controlling the aircraft speed, a means for selecting and displaying a desired altitude and an automatic control to capture and maintain that altitude through the pitch control system, a means for automatically capturing and maintaining the present altitude, a coordinated operation of the pitch and engine thrust control systems to automatically transfer speed control from one system to the other depending on whether the aircraft is commanded to climb, descend, or maintain altitude, a logic system based on the polarity and magnitude difference between the selected altitude and present altitude for transferring aircraft speed control automatically from the engine thrust control system to the pitch control system and also automatically establishing the correct engine control operation depending upon whether the pilot wishes to climb or descend, means for the system to be connected to another device which contains preprogrammed or pilot programmable vertical path profiles to generate the values either fixed or variable for aircraft speed, engine thrust and altitude, and means to couple and uncouple the computed control outputs to either the automatic elevator and engine control systems or to couple the pitch control outputs to a flight director for semiautomatic operation.

Figure 2:
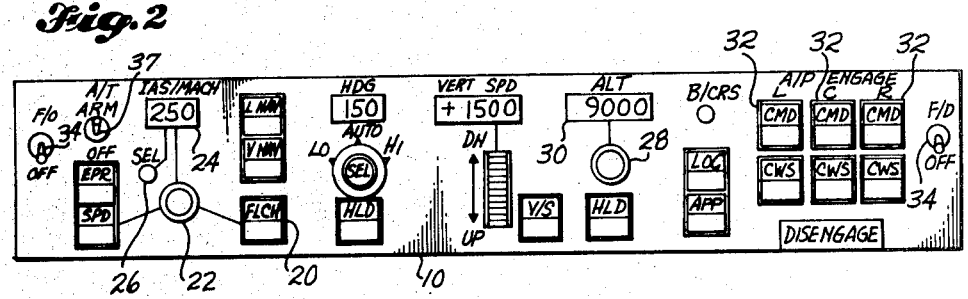
Figure 3:
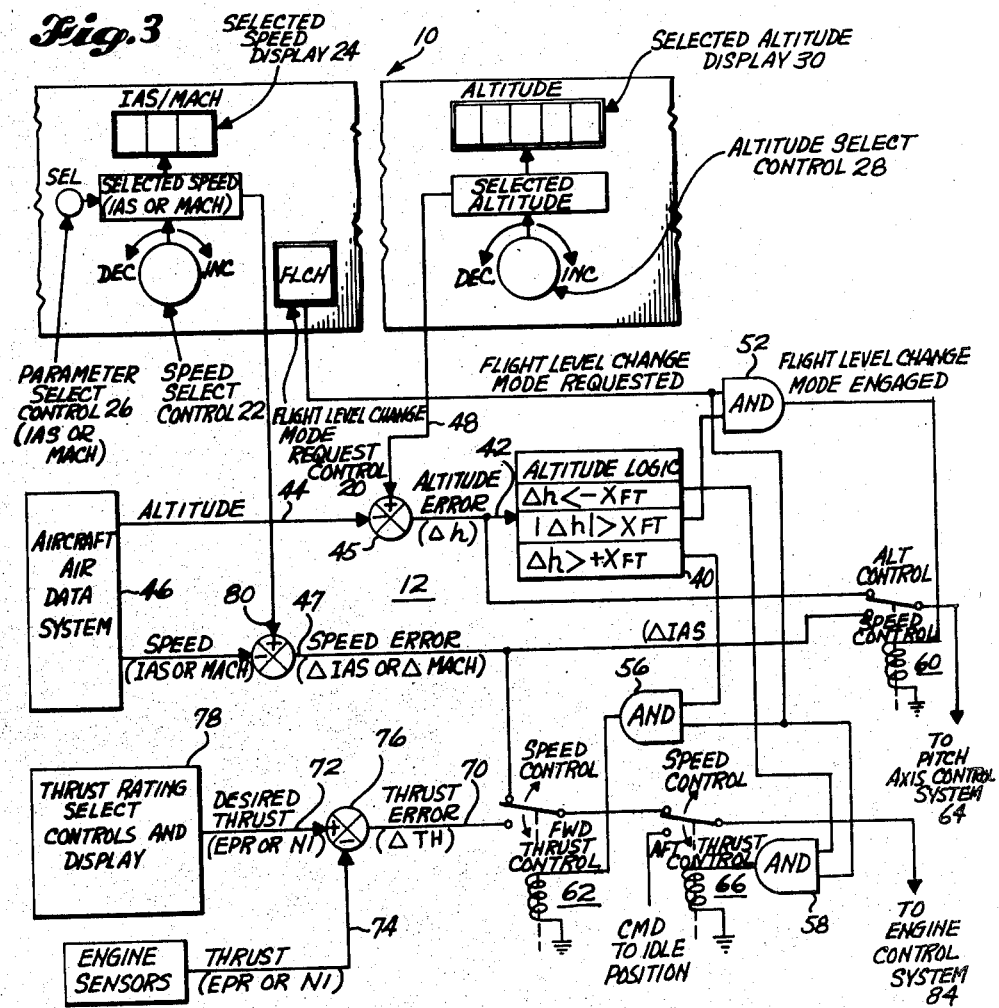

A full understanding of the invention, and of its further objects and advantages and the several unique aspects thereof, will be had from the following description when taken in conjunction with the accompanying drawings in which:

FIG. 1 is a functional block diagram of an aircraft autopilot and autothrottle control system showing the present interactive flight control mode logic and display;

FIG. 2 is a front view of the automatic flight control system mode control panel including controls and displays for use in an autopilot and autothrottle control system in accordance with a preferred embodiment of the present invention; and, FIG. 3 is an enlarged fragmentary view of two parts of the automatic flight control system mode control panel of FIG. 2 including in schematic form the present interactive vertical path control system providing integrated pitch and thrust control.

Turning now to FIG. 1, a complete pitch axis 64 and engine control system 84 is seen including autopilot 16 and autothrottle 18 utilizing state of the art control laws. Upstream from pitch axis 64 and engine control system 84, mode control circuit 12 utilizes a single set of pilot selectable controls, viz. mode select, speed, and altitude select (as shown in more detail in the schematic embodiment shown in FIG. 3) to control autopilot system 16 and autothrottle control system 18 of pitch axis 64 and engine control system 84.

Turning now to automatic flight control system mode control panel 10 of FIG. 2, it will be readily seen when comparison is made with FIG. 3, that the controls and displays of interest in control of the aircraft are mode select control 20 (shown as but not required to be, a push button type control), speed select control 22, selected speed display 24, (parameter) airspeed or Mach select control 26, altitude select control 28, and selected altitude display 30. In FIG. 2, one channel of autopilot is required to be engaged in CMD (at 32) or F/D (at 34). Another standard control consideration in deployment of the present system embodiment is that autothrottle 18 (shown in FIG. 1) must be armed at 37 on FIG. 2 (or the speed reference bug on Mach-Airspeed Indicator used for manual throttle control).

FLIGHT LEVEL CHANGE MODE (FL CH)

The FL CH mode of operation is manually selected by operating FL CH MODE REQUEST CONTROL switch 20 shown in FIG. 3. Altitude logic circuit 40 operates to determine the polarity and magnitude of altitude error signal 42 (which is the difference at the output of combining circuit means 45 between aircraft altitude signal 44 provided by aircraft air data system 46 and selected altitude signal 48 determined by flight crew manual selection at altitude select control 28).

If altitude error signal 42 is low valued, i.e. representative of $\Delta h$ in the expression: $|\Delta h| > x$ ft, then AND gates 52, 56 and 58 are inhibited, so that relays 60, 62, and 66 cannot be energized. Also, if altitude error signal 42 is low valued, the selection of the FL CH MODE is automatically cancelled and mode control circuit 12 reverts to the Altitude Hold mode of operation (a feature not explicitly shown in FIG. 3). The value of X is a variable dependent upon altitude capture control laws and the current conditions e.g. at, or close to, the selected altitude; climbing towards the selected altitude; or descending towards the selected altitude.

If altitude error signal 42 is greater than X ft, either positive or negative, AND circuit 52 is turned ON by the logic combination ($|\Delta h| > x$ ft) of altitude logic circuit 40 AND FL CH MODE REQUESTED, thereby causing relay 60 to be energized. Energizing relay 60 switches the output to pitch axis control system 64 from an altitude error ($\Delta h$) representative signal 42 to a speed error ($\Delta IAS$ or $\Delta M$) representative signal 47 and the pitch axis will compute output commands to control the aircraft speed to the selected value by means of elevator control. The selected speed reference can be either an airspeed value or a Mach number value, and the elevator control can be either direct (through the pitch autopilot servo) or indirect (through manual control inputs in response to flight director pitch commands generated by the pitch axis control system.

If the aircraft is below the selected altitude, i.e. $\Delta h > +x$, AND circuit 56 will also be turned ON which causes relay 62 to be energized and allows thrust error signal 70 (provided by subtraction of signal 72 representative of desired thrust from signal 74 representative of actual thrust in combining circuit 76) to be coupled downstream through the normally open contacts of relay 62.

Desired thrust signal 72 is generated by thrust rating select control means 78 and comprises a forward thrust limit value selected by the crew or alternatively, by an aircraft performance computer. Since relays 62 and 66 cannot both be energized simultaneously, relay 66 will be deenergized and thrust error signal 70 will be coupled on downstream through the normally closed contacts of relay 66 to engine control system 84. The engine control system responds by automatically driving the engine controls to capture and maintain the selected forward thrust limit value. In this condition, the excess engine thrust will cause the aircraft to climb with the aircraft speed controlled through the elevator as hereinabove described.

The aircraft will continue to climb in this manner until it approaches within X ft of the selected altitude, at which point AND function circuits 52 and 56 are both turned off again which results in relays 60 and 62 being deenergized. This action causes the output to pitch axis control system 64 to revert to altitude error signal 42 and control the aircraft to capture and maintain the selected altitude through elevator control, and the output to engine control system 84 to revert to speed error 47 and control the engine thrust to maintain selected speed 80 set by speed select control 22.

If altitude error signal 42 is of negative polarity, that is, $\Delta h > -X$ when the FL CH mode is selected by climb/descent mode request control 20, i.e. the aircraft is above the selected altitude, a similar sequence of events to the preceding will occur in mode control circuit 12 except that, in this case, relay 66 will be energized (by the AND function of circuit 58) instead of relay 62. In this condition the output to engine control system 84 will be a command to a predetermined "IDLE" position.

The idle position may be a variable, depending on engine anti-ice ON/OFF etc., and may also be a "one-time" command to allow the flight crew to make subsequent manual adjustments of the thrust setting. The reduction in thrust will cause the aircraft to descend towards the selected altitude with the aircraft speed being controlled to the selected value through elevator control.

Similarly to the climb case, when the aircraft descends to within X feet of the selected altitude, the pitch axis control parameter will revert to altitude error causing the aircraft to capture and maintain the selected altitude through elevator control and the engine control system control parameter will revert to speed error causing the aircraft to maintain the selected speed through thrust control.

We claim:

1. In combination in an aircraft for providing speed control throughout the airspeed/mach range of said aircraft:

a pitch axis control system; an engine control system; first switch means for selectively providing either an airspeed or mach signal representative of a desired selected reference speed; a single display means for displaying either the airspeed or mach selected by said first switch means; logic means for providing logic command signals in response to desired climb, descend, or maintain altitude maneuvers of said aircraft; and, second switch means responsive to said logic command signals for automatically selecting said pitch axis control system to control the aircraft to said selected reference speed when said aircraft is commanded to climb or descend, and for automatically selecting said engine control system to control the aircraft to said selected reference speed when said aircraft is commanded to maintain altitude.

* * * * *